Oct. 10, 1961  C. C. HAMILTON ET AL  3,003,482
INTEGRAL FURNACE-VAPOR GENERATOR
Filed April 29, 1958  5 Sheets-Sheet 1

INVENTORS
Carl C. Hamilton
Norman W. Young
BY
*J. P. Moran*
ATTORNEY

United States Patent Office 3,003,482
Patented Oct. 10, 1961

3,003,482
INTEGRAL FURNACE-VAPOR GENERATOR
Carl C. Hamilton, Cuyahoga Falls, Ohio, and Norman W. Young, Huntington Station, N.Y., assignors to The Babcock & Wilcox Company, New York, N.Y., a corporation of New Jersey
Filed Apr. 29, 1958, Ser. No. 731,781
6 Claims. (Cl. 122—478)

This invention relates to an improved vapor generating and heating apparatus and more particularly to a compact, integral, pressurized furnace steam generator designed for power, process or heating loads requiring steam capacities in the general range of 80,000 to 400,000 lbs. per hr. with steam temperatures ranging to 900° F. and design pressures in the range of 250 to 1200 p.s.i.

In steam generators having steaming capacities of 80,000 to 400,000 lbs. of steam per hr. experience shows that a considerable portion of the initial cost of such generators is attributed to the high cost in time, manpower, material handling, etc. normally required for field erecting the same. It is therefore an object of this invention to provide a novel steam generator arrangement utilizing standardized, prefabricated, shop assembled components to the maximum extent possible so as to substantially reduce the time, manpower and material handling cost normally required in erecting such units and thereby produce proportionate savings in the initial unit cost.

Another object is to provide a high capacity steam generating unit requiring a minimum amount of boiler room volume for a given power output. This is attained by a neat, compact, completely bottom supported, integral furnace-boiler construction in which long column supporting members and other cumbersome steel work are eliminated. This construction also renders it possible to eliminate a considerable amount of duct work, insulation and refractory.

Another object is to provide in the present integral furnace-boiler construction a steam superheater positioned within a cavity in juxtaposition to the furnace cavity so steam flowing therein will be predominantly heated by the radiant heat of the combustion gases generated in the furnace, and the surface arranged to give an optimum balance between heat absorption rates, tube metal temperatures and tube metal requirements.

It is another object to provide in an integral furnace-boiler construction, an arrangement whereby one of several different arrangements of steam superheaters, depending on the design flow and temperature conditions desired, can be incorporated within the unit without necessitating material structural alteration of the other components and/or changes in the relative position of any of the other components with respect to one another.

The foregoing objects and other advantages of the present invention are attained in a neat, compactly arranged, bottom supported integral furnace-vapor generating unit. The unit is divided into three cavities, namely a furnace cavity, a vapor heating cavity and a vapor generating cavity, each of which is co-extensive with the width of the unit with the vapor heating cavity positioned between the furnace cavity and the vapor generating cavity. A tube bank and a superheater are positioned in the vapor generating and vapor heating cavities respectively, the superheater being arranged to receive predominantly radiant emission from the heating gases generated in the furnace. A major portion of the wall area defining the cavities is composed of pre-assembled, shop fabricated membrane wall panels that can be readily field erected in whole sections. According to this invention "blocks" of superheating elements of various designs may be utilized in the vapor heating cavity of the unit to provide for the required design conditions and also for field adjustment of superheater surface without the necessity of altering any of the unit components or changing the relative positions thereof. The integral furnace-boiler further utilizes fluid cooled tubular ties that extend between opposite side walls and connect into the fluid supply and riser systems of the side walls, thus becoming an integral part of the furnace sidewall circulating system. Baffle means are disposed within the unit for directing horizontally flowing gases in crossflow relation to both the superheater and boiler tube surfaces so as to attain the most efficient arrangement of heating surface for a given volume. The entire unit is enclosed by an outer casing, with that portion which extends along the top and front of the unit spaced therefrom to define a combustion air duct formed integral with the roof vestibule and burner wind box.

A feature of this invention resides in the provision that all of the superheater designs are such that each "block" is bottom supported and drainable with lateral restraint of the superheater tubular elements being provided by extending the elements upwardly through the aligned spaces formed by adjacent pairs of floor, screen and roof tubes.

Another feature of this invention resides in the integrally formed combustion air duct which results in minimizing the amount of duct work as well as affording a saving in space and the amount of insulation heretofore required.

Other features and advantages will be readily apparent when considered in view of the drawings and description in which.

Figure 1:
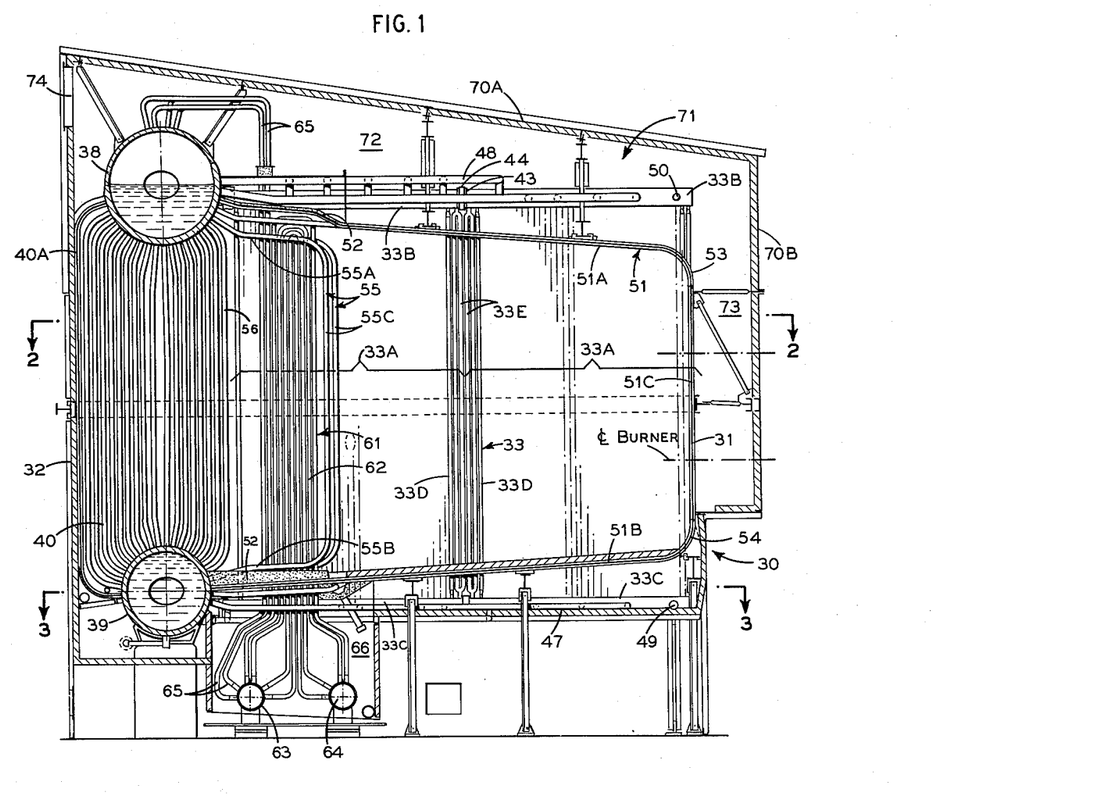
FIG. 1 is a sectional side elevation of the integral pressurized furnace boiler unit taken along line 1—1 of FIG. 3.
Figure 2:
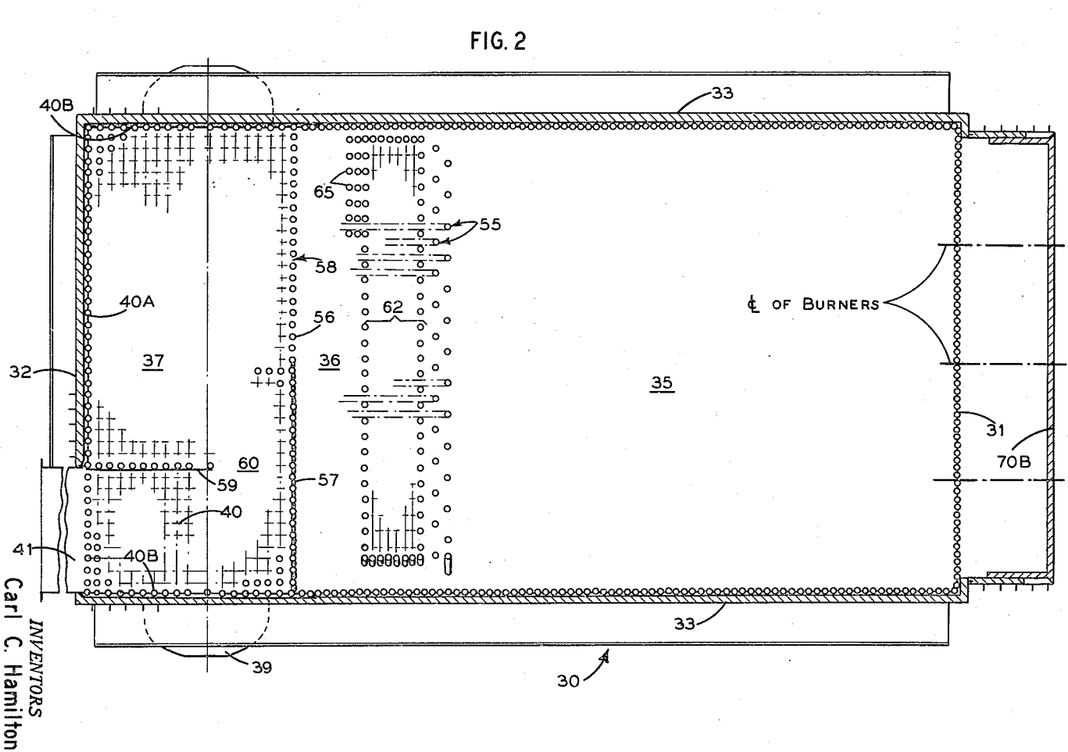
FIG. 2 is a sectional plan view taken along line 2—2 of FIG. 1.
Figure 3:
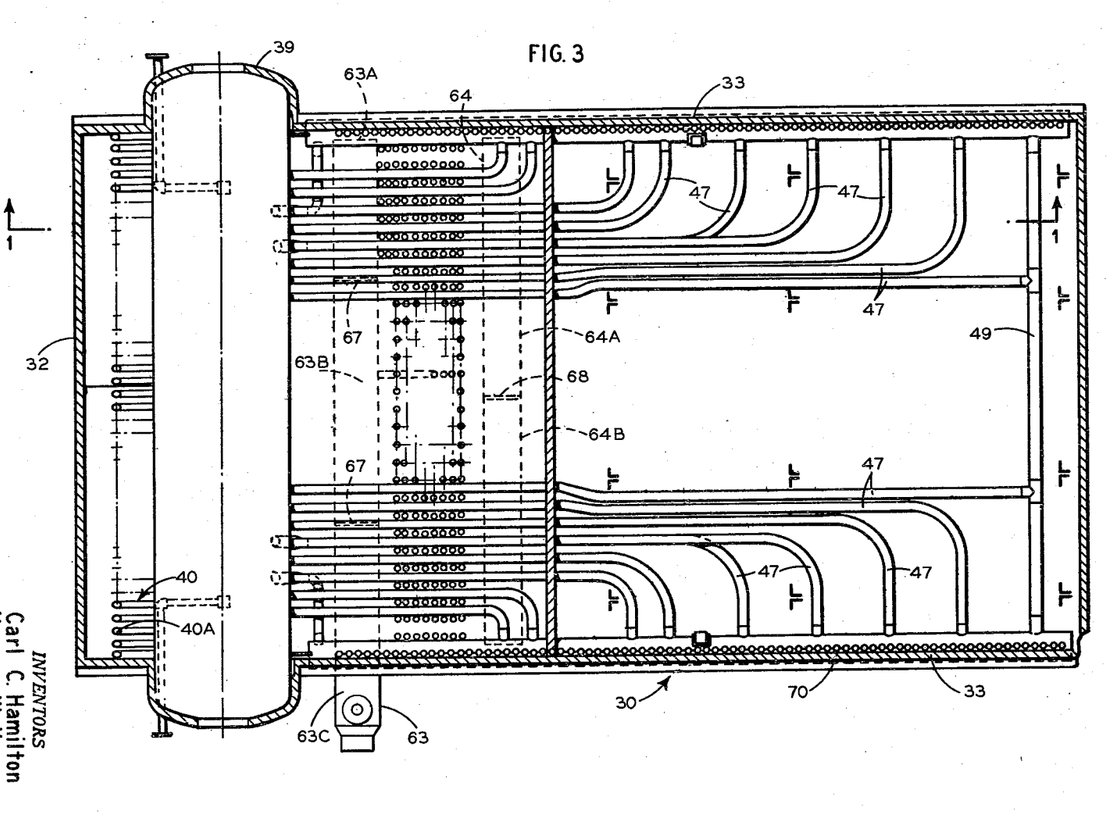
FIG. 3 is a sectional plan view taken along line 3—3 of FIG. 1.

Referring to FIGS. 1, 2 and 3 there is shown in accordance with this invention a compact, pressure fired, integral furnace-boiler unit 30 having enclosing front, rear and opposed side walls 31, 32, 33 respectively, defining a furnace cavity 35, a steam heating cavity 36 and steam generating cavity 37. A steam generating means is disposed in cavity 37 and includes a steam and water separating drum 38 which extends across the width of the unit and a water drum 39 positioned thereunder. Connecting drums 38 and 39 is a bank of boiler circulatory tubes 40 arranged for fluid flow therethrough. The arrangement of the tube bank 40 is such that the rear row of tubes 40A and outer end rows of tubes 40B are studded with the exception of the tubes adjacent a flue opening 41 in the rear wall.

In accordance with this invention the remainder of each side wall, i.e. the portions extending along the furnace and superheater cavities, consist of a plurality of integral, shop assembled, panel sections 33A. While the side walls may include any number of such panels depending on the size of the unit, in the illustrated embodiment of FIG. 1, each side wall 33 includes two such panels 33A, arranged in side by side, co-planar, contiguous relationship, to one another. Each panel section 33A includes an upper side wall header segment 33B and a lower side wall header segment 33C with a row of generating tubes 33D connecting header segments 33B, 33C into fluid circulation, the tubes 33D also serving as furnace wall cooling tubes.

Figure 8:
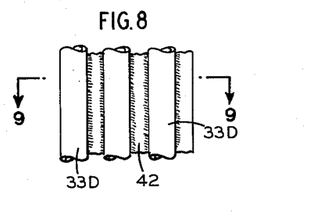
FIG. 8 is an enlarged detail view illustrating the membrane or panel wall construction in the instant invention.
Figure 9:
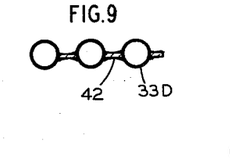
FIG. 9 is a section view taken along line 9—9 of FIG. 8.

The preferred arrangement illustrates a side wall panel 33A made of 2½ inch O.D. tubes, 33D, spaced on 3 in. centers with the spaces formed between adjacent tubes sealed gas tight by rods 42 welded to the adjacent tubes 33D throughout the length thereof, see FIGS. 8 and 9. This type of construction is herein referred to as a membrane or panel wall. As an alternate construction (not shown) the tubes of each panel 33A may be formed as gas tight tangent touching tubes.

Figure 4:
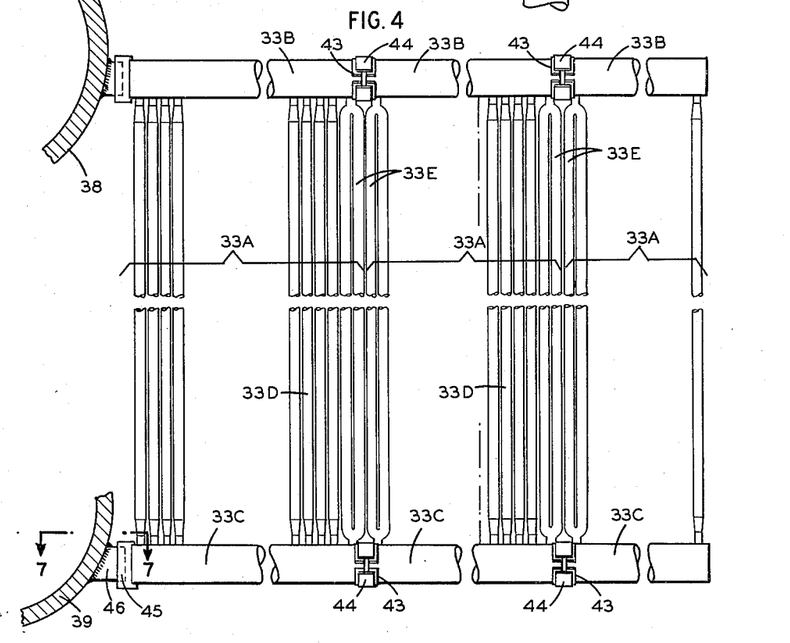
FIG. 4 is a detailed side view of a modified side wall of the unit illustrating at least three panel sections joined to form an integral side wall arrangement, portions thereof being broken away.
Figure 5:
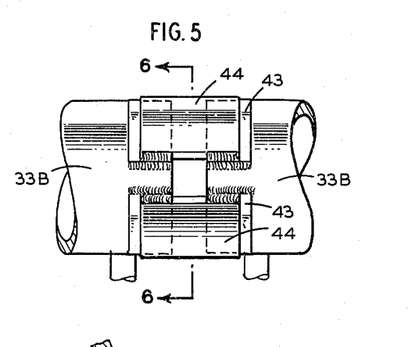
FIG. 5 is an enlarged detail illustrating means of joining the side wall panel header segments together.
Figure 6:
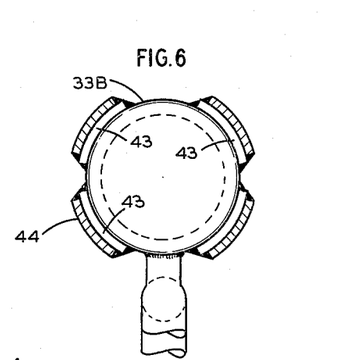
FIG. 6 is a sectional view taken along line 6—6 of FIG. 5.
Figure 7:
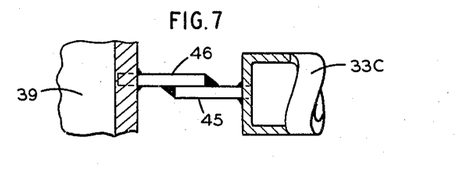
FIG. 7 is a sectional view taken along line 7—7 of FIG. 4.

As shown in FIGS. 4, 5 and 6, there is welded to adjacent end portions of both the upper and lower header segments 33B, 33C of panels 33A circumferentially spaced bands 43. These bands 43 are preferably welded in the shop and the welds stress relieved. In field erecting the side wall panels 33A form an integral side wall, the juxtaposed panels 33A are joined by field welding circumferentially spaced tie bands 44 to bands 43 and sealing the space between juxtaposed end tubes 33E of the adjacent panels. FIG. 4 illustrates a modified side wall construction having at least three panels 33A so joined. With the upper and lower headers joined as described, the ends of the integral headers which terminates adjacent drums 38, 39 respectively, are rigidly connected thereto by welding the end of the headers to a plate 45 which in turn is welded to a drum plate 46.

A series of supply tubes 47 connect each of the lower header segments 33C of each panel 33A into circulation with the lower drum 39 and a plurality of riser tubes 48, similarly arranged connect the upper header segments 33B of each panel 33A into communication with the upper drum 38. As best seen in FIGS. 1 and 3 there is included as part of the supply and riser tube systems 47, 48 respectively, fluid cooled, cross-tie tubes 49, 50 which in addition to equalizing the fluid flow to the side walls 33 function also as a structural side to side ties connecting opposed corresponding lower and upper header segments 33C, 33B respectively as shown in FIG. 3.

Referring to FIG. 1, a plurality of substantially C-shaped tubes 51 with upper and lower leg portions 51A, 51B thereof extending laterally of drums 38 and 39, form the furnace roof and floor respectively and the bight portion 51C thereof forms the furnace front wall. The tube segments 51A, 51B which define the upper and lower limits of the furnace cavity converge slightly toward the front and like the side wall panels are preferably formed of 2½ in. O.D. tubes spaced on 3 inch centers. The spaces between the floor and roof tubes are likewise sealed gas-tight by rods welded to adjacent tube pairs as hereinbefore described. Alternate end portions of roof and floor tubes which extend above and below the superheater cavity 36 and connect into the upper and lower drums 38, 39 respectively, are offset to facilitate the connection thereof to the respective drums 38 and 39 and to provide spaces for laterally restraining superheater elements as will be hereinafter described. Where the tubes 51A, 51B are offset, refractory 52 is used to render this portion of the floor and roof gas tight.

To facilitate field erection of the unit in accordance with this invention, the roof, floor and front wall of the furnace are constructed in the shops as separate membraned panel walls as described. The number of panels or sections as hereinbefore defined is determined by the size of the unit and/or upon the allowable shipping clearances. It is contemplated that both the floor and roof panel sections, which are substantially similar, be formed of welded membraned tube straights with the bends at 53 and 54, respectively, being formed after the tube straights have been welded together to form the panels. The front wall will consist of one or more membrane panels having integrally formed burner ports for accommodating suitable burner means. Thus field erection of the wall portions is expedited since the floor and roof panels can be simply welded to the corresponding lower and upper ends of the front wall panels.

Separating the steam heating cavity from the furnace cavity 35 is a row of substantially C shaped tubes 55. Tubes 55 have relatively shorter upper and lower leg segments 55A, 55B extending laterally of drums 38 and 39, respectively, with the bight portion 55C therebetween forming a screen. As seen in FIGS. 1 and 2 every other screen tube 55 has upper and lower leg segments 55A, 55B which are slightly longer than those of the next adjacent tube so that a staggered screen having relatively wide spacings between bight portions 55C is attained, and the transverse spacing between adjacent leg portions 55A, 55B of the screen tubes 55 is such as to accommodate the superheater tubes to be described.

As best seen in FIG. 2 each of the cavities extend the full width of the unit with the superheater cavity 36 adjacent the furnace cavity 35. Thus the superheater cavity 36 is bounded by the row of staggered screen tubes 55, tubes of the side wall 33, and the front tube row 56 of the generating tube bank 40. As seen in FIG. 2, the superheater cavity 36 is open to the steam generating cavity 37 only over a portion of its boundary with a barrier or baffle means 57 formed throughout the other portion of its boundary. The barrier 57 is formed by closing the spaces between adjacent tubes in the front row 56 of the generating tube bank 40 with studs and/or suitable refractory or brick. The barrier or baffle 57 extends inwardly of one side wall 33 substantially perpendicular thereto to a point approximately mid-way between the side walls 33 and extends upwardly from the floor to the roof. Thus the heating gases, generated by suitable burners disposed in the front wall, flow through the furnace cavity 35, through the open screen 55 into the superheater cavity 36, the baffle 57 directing the gases laterally through the superheater cavity 36 to exit therefrom through opening 58 which is in communication with the steam generating cavity 37. A second baffle means 59 extends inwardly from the rear wall 32 adjacent the outlet flue opening 41 and extends to a point several tube rows short of baffle 57 to form therewith a restricted passageway 60 through which the gases flowing laterally through the tube bank 40 are channeled to flue opening 41.

According to this invention a completely drainable superheater 61 is disposed in cavity 36. Generally the superheater 61 in the unit described comprises a plurality of vertically disposed, inverted loops of nested tubes forming platens 62 which are laterally spaced across the width of the cavity, the ends of the loop tube connecting a first superheater header 63 and a second superheater header 64. A plurality of saturated steam pipes 65 connect the first header to the steam drum 38 and supplies steam to the superheater. The first and second superheater headers 63, 64 are disposed out of the gas pass in a vestibule 66 beneath cavity 36, and are thus rendered readily accessible. The tube platens 62 extend upwardly from the headers 63, 64 through aligned spaces formed between adjacent floor, screen and roof tubes. With this arrangement the superheater 61 is entirely bottom supported and the roof and/or screen tubes provide the lateral restraint for the superheater platens. In the superheater arrangement described all superheater supports exposed to the heating gases and susceptible to corrosion are eliminated.

In the superheater arrangement illustrated in FIGS. 1, 2, 3 and 14, the first header 63 is divided into three chambers by a pair of diaphragms 67 and the second header 64 is partitioned into two chambers by diaphragm 68. In this arrangement the saturated steam pipes 65 deliver steam into chamber 63A of the first header 63, as viewed in FIGS. 3 and 14 and passes from chamber 63A to the chamber 64A of the second header 64, thence back to the middle chamber 63B of the first header 63, thence to the chamber 64B of second header 64 and then to the chamber 63C of header 63 from whence it is delivered to a point of use by suitable piping.

An important feature of this invention is that in the integral furnace-boiler arrangement described a number of differently designed superheater arrangements capable of sustaining substantially constant superheat over widely changing load ranges may be utilized. Referring to FIGS. 11 to 16 there are schematically shown a number of the different arrangements which may be incorporated, the particular selection of the desired arrangement being determined by the steam flow and superheat steam temperature design conditions. The nicety of the instant invention is that any of the superheater arrangements to be described may be used and fitted into a standard setting, as herein described, without requiring any material alteration of any of the other components of the unit or any changing of their relative positions with respect to one another. Thus standardization of a major portion of the component parts is attained. At the same time it is possible to attain a relatively large degree of flexibility as regards to the steam outputs, temperatures and pressures simply by the proper selection of one of the several superheater arrangements. Further the present integral furnace-boiler arrangement permits expansion for anticipating augmented future operating conditions by utilizing a "block" superheater concept.

Figure 10:
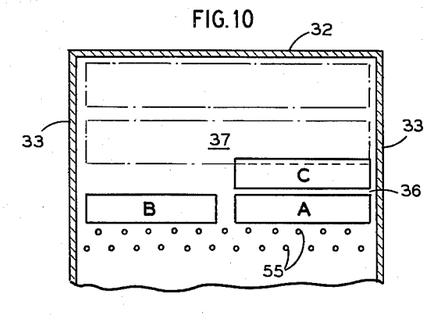
FIG. 10 is a schematic layout of the vapor heating and vapor generating cavities illustrating the superheater "block" arrangement used in the unit.

FIG. 10 illustrates schematically the plan section of the steam heating and generating cavities 36 and 37 respectively, and the "block" diagram of the superheater arrangement. Each of the "blocks" A, B and C represent a specific superheater component or arrangement which can be used separately or in functional combinations depending on final steam temperature desired.

Figure 11:
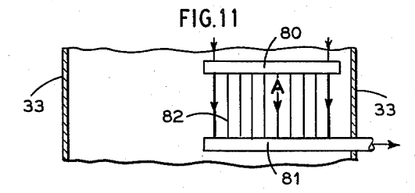
FIG. 11 is a schematic showing of the superheater arrangement of block A.

Superheater "block" A, illustrated schematically in FIG. 11, comprises an inlet header 80 and an outlet header 81 connected by vertically extending, inverted loop tubes forming platen elements, as hereinbefore described, in a single steam pass arrangement with the direction of steam flow indicated by the arrows.

Figure 12:
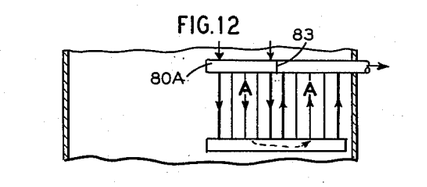
FIG. 12 is a modified superheater arrangement of block A.

FIG. 12 illustrates a modified form of "block" A wherein the inlet header 80A is diaphragmed at 83 to provide two pass steam flow therethrough. It is to be noted that "block" A as illustrated in FIGS. 11 and 12 occupies only a portion of the superheater cavity as evidenced in FIG. 10.

Figure 13:
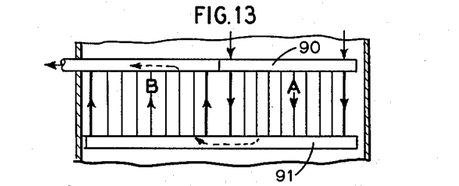
FIG. 13 illustrates superheater arrangement of blocks A and B combined.

FIG. 13 illustrates the single steam pass "block" A in combination with a single pass "block" B in which the combined "blocks" A and B occupy the entire width of the cavity 36. In this arrangement header 90 is diaphragmed and is serially connected to header 91 by platen tube elements, as described, so as to provide a combined arrangement with a two pass steam flow.

Figure 14:
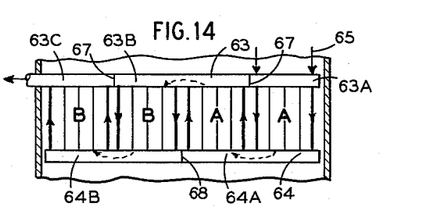
FIG. 14 illustrates a modified arrangement of blocks A and B combined.

FIG. 14 illustrates schematically the superheater arrangement herein described with reference to the description of FIGS. 1, 2 and 3 wherein "blocks" A and B are serially connected with each block having a two pass steam flow therethrough.

Figure 15:
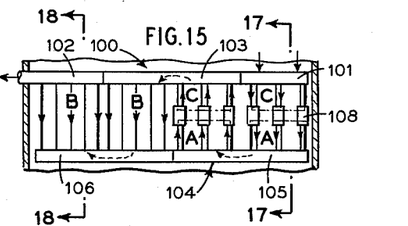
FIG. 15 illustrates a superheater arrangement utilizing a combination of blocks A, B and C.
Figures 17, 18:
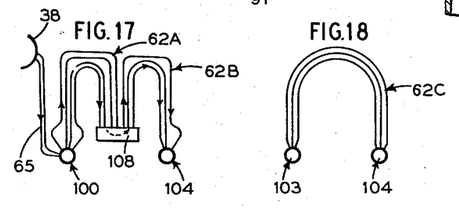
FIG. 17 is a diagrammatic section view taken along line 17—17 of FIG. 16.
FIG. 18 is a diagrammatic showing taken along line 18—18 of FIG. 16.

FIG. 15 illustrates diagrammatically a superheater arrangement comprising blocks A, B and C which are functionally connected for serial steam flow therethrough wherein the steam flow first makes two passes through combined serially connected, block sections A and C and thence two steam passes through block B associated therewith. As shown in FIGS. 10 and 15 "block" C is disposed downstream gas-flow wise of block A and is substantially co-extensive therewith to occupy approximately one half of cavity 36. "Block" B is positioned juxtaposed to "block" A to occupy the other portion of the cavity. In this arrangement header 100 which extends substantially transversely of the unit is diaphragmed so as to form an inlet chamber 101, an outlet chamber 102, and an intermediate chamber 103. A second header substantially parallel thereto and spaced therefrom is diaphragmed to form a pair of chambers 105 and 106. The superheater tubular elements of "block" C include a plurality of nested, looped tubes forming platen elements 62A (FIG. 17) connecting header 103 to a plurality of intermediate mixing stub header 108 and "block" A includes a plurality of nested, loop tubes forming platen elements 62B (FIG. 18) connecting the stub headers 108 to header 104 for serial steam flow therethrough. In "block" B platen elements 62C (FIG. 18) connect header 103 to 104. As illustrated in FIGS. 15 and 17 saturated steam from drum 38 is delivered to chamber 101 through steam pipe 65. As indicated by the arrows in FIG. 15, the steam makes two passes through combined "blocks" A and C and thence makes two passes through "block" B.

Figure 16:
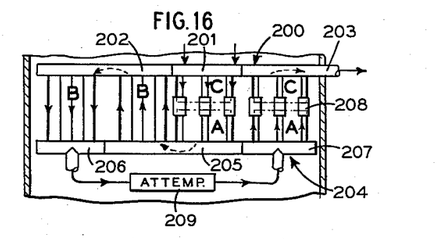
FIG. 16 is a modified version of superheater arrangement comprising blocks A, B and C.

FIG. 16 illustrates another or modified functional arrangement of combined "blocks" A, B and C connected for serial steam flow therethrough, the arrangement being such that the steam flow first makes one pass through a portion of serially connected "blocks" A and C, thence two passes through "block" B and finally another or second pass through another portion of serially connected combined "blocks" A and C. As shown header 200 is diaphragmed to form chamber 201, 202 and 203 and header 204 is likewise partitioned to form chambers 205, 206, and 207.

Superheater tubular elements as described and shown in FIG. 17 of "block" C connect chamber portions 201 and 203 of header 200 in communication with stub headers 208, and the superheater tubes of "block" A as described with reference to FIG. 17 connect the stub header 208 to chambers 205 and 206. In the "block" B portion of the superheater arrangement, tubes as described with reference to FIG. 18 connect chambers 205 and 206 of header 204 in communication with chamber 202 of header 200. As indicated by the arrows, saturated steam enters the middle chamber 201 of header 200 and flows therefrom to make one pass through serially connected, combined "blocks" C and A, from whence it flows serially through two passes in "block" B. The steam upon leaving "block" B is then passed through an attemperator 209. From the attemperator the partially superheated steam is introduced into chamber 207 of header 204 from whence it makes a final steam pass through another portion of the serially connected, combined "blocks" A and C.

While the foregoing superheater arrangements are shown and described as having integral diaphragmed headers, it will be understood that separated and distinct headers may be substituted therefor so that the "blocks" may be formed as separate and distinct entities. Further the superheater arrangements herein described are completely drainable to facilitate rapid and safe starting and stopping since condensate can be drained as it forms.

In locating the various superheater arrangements close to the furnace cavity in the manner shown and described, the superheaters are thus rendered semi-radiant, i.e. they are heated to a large extent by radiant heat of the gases from the furnace and thus approach the ideal superheater characteristic of substantially constant steam temperature over a wide load range.

It is to be further appreciated that in utilizing any of the foregoing superheater arrangements in the unit described, the boiler tube bank 40 remains virtually intact with its full complement of tubes, thus insuring adequate support for the steam drum and boiler superstructure.

Further the instant unit has a high heat absorption capacity in that the gases flow across the steam generating and steam heating tubes to attain an efficient and economical arrangement of heating surface for a given volume. In flowing through the unit the heating gases strike the tubes at a 90° angle and create enough turbulence to rapidly disperse the relatively cool gas film which flows around the outside walls of the tubes. Steam generation is thus rapid in that the heat of the gases is free to flow quickly and effectively through the wall of tubes in the superheater and boiler banks.

This invention further contemplates utilizing all boiler, furnace and superheater tubes of one diameter, e.g. 2½ inch O.D. so that only a small inventory of spare tubes is required. As a result a minimum investment in replacement parts and less storage space is therefor required.

In accordance with this invention the entire unit is enclosed by an outer casing 70. The portion 70A, 70B of the casing which extends along the top and front of the unit is spaced from the respective roof and front wall tubes to form therewith a combustion air duct 71 which is integral with the roof vestibule 72 and burner wind box 73. Air, which may be preheated in a suitable air heater, not shown, enters the air duct 71 through an opening 74 in the rear wall.

The entire unit is insulated by a blanket of insulating material positioned adjacent the inner surface of the casing. With the insulating material disposed on the inside of the casing, weldments to the exterior face of the casing are readily effected and thus facilitates erection.

Further the all welded membrane wall construction eliminates the need for internal closure refractory, and thereby eliminates refractory maintenance problems and cost of refractory. This type of construction further makes it possible to pre-assemble furnace wall sections and still maintain a fine quality pressure tight furnace. Further the pre-assembly of much of the instant arrangement can be carefully scheduled and manufacture controlled thereby with a consequent reduction in erection time and man hours otherwise normally required.

While the instant invention has been disclosed with reference to a particular embodiment thereof, it is to be appreciated that the invention is not to be taken as limited to all of the details thereof as modifications and variations thereof may be made without departing from the spirit or scope of the invention.

We claim:

1. A pressure fired vapor generating and heating apparatus comprising rectangularly disposed front, rear and connecting side walls including spaced upright tubes to define a furnace cavity, a vapor heating cavity, and a vapor generating cavity, said cavities being disposed in side by side relationship and each extending co-extensively transversely the entire width of said apparatus, said vapor heating cavity being disposed between said furnace cavity and said vapor generating cavity, vapor generating means disposed in said vapor generating cavity, said vapor generating means including an upper liquid-vapor separating drum, a lower drum, and a bank of vapor generating tubes connecting said drums, a row of spaced continuous C-shaped tubes connecting said drums, said C-shaped tubes having relatively long upper and lower leg segments extending laterally from each of said drums to define the floor and roof of said vapor heating cavity and furnace cavity, and the integrally formed bight of said C-shaped tubes forming the front wall of said furnace cavity, metallic membranes sufficiently rigid to contain the pressure within the vapor heating and furnace cavities welded to and between the adjacent C-shaped tubes and the side wall tubes so as to seal the spaces between adjacent tubes gas tight, a second row of spaced C-shaped tubes connecting said drums, the tubes of said second row having relatively short upper and lower leg segments extending laterally from their respective drums and having the bight portion thereof forming a screen of relatively widely spaced tubes to separate the furnace cavity from said vapor heating cavity, a bank of predominantly radiant heated vapor heating means disposed in said vapor heating cavity immediately behind said screen, means connecting said vapor heating means in communication with the upper vapor-liquid separating drum, and burner means for directing heating gases through the front wall of said furnace cavity directly opposite and normal to the bank of vapor heating whereby said gases flow in a direction from said furnace cavity to said vapor heating cavity en masse over the entire exposed length of said vapor heating tubes in single horizontal gas pass in cross-heat transfer relationship thereto, and thence horizontally through the vapor generating cavity in cross flow heat transfer relationship over the entire exposed length of the generating tubes disposed in said vapor generating cavity.

2. A compact pressure fired vapor generating and heating unit comprising rectangularly disposed front, rear and side walls of spaced vapor generating tubes, means including a rigid membrane connected to and between adjacent tubes to define a gas tight unit enclosing a furnace cavity, a vapor generating cavity and a vapor heating cavity arranged in juxtaposed side by side relationship with the vapor heating cavity disposed between said furnace cavity and said vapor generating cavity, each of said cavities being co-extensive with the entire width of said unit, said vapor heating cavity being in open communication throughout the entire width of said furnace cavity and in open communication throughout only a portion of the width of said vapor generating cavity, means forming a flue opening in said rear wall in communication with said vapor generating cavity, vapor generating means disposed in said vapor generating cavity, said vapor generating means including an upper liquid-vapor separating drum and a lower liquid drum extending across the width of said unit and a bank of generating tubes transversing the width of said vapor generating cavity connecting said drums, a row of roof tubes connecting said front wall tubes in communication with said upper drum and a row of floor tubes forming continuations of said front wall tubes connecting to said lower drum, a predominantly radiant heated vapor heater disposed in said vapor heating cavity and arranged to receive separated vapor from said liquid-vapor drum, burner means arranged in the front wall opposite said vapor heater for discharging heating gases into said furnace wherein the heating gas flow is directly from the furnace cavity, through the vapor heating cavity and thence through the vapor generating cavity in a horizontal flow path en masse in single pass in cross-flow heat transfer relationship over the entire exposed length of said vapor generating tubes and vapor heating tubes, and exiting therefrom through said flue opening, and a baffle means disposed perpendicularly to one of said side walls between said vapor heating cavity and said generating cavity for horizontally restricting the flow of said gases from said vapor heating cavity to said vapor generating section.

3. A pressure fired vapor generating and heating unit comprising rectangularly disposed front, rear and side walls including membraned vapor generating tubes defining a gas tight pressurized zone including a furnace cavity, a vapor generating cavity, and a vapor heating cavity arranged in juxtaposed side by side relationship with the vapor heating cavity being disposed between said furnace cavity and said vapor generating cavity, each of said cavities being co-extensive with the width of said unit, said vapor heating cavity being in open communication with said furnace cavity throughout the width thereof and in open communication with only a portion of said vapor generating cavity, means forming a flue opening in said rear wall in communication with the opposite side of said vapor generating cavity, a vapor generating means disposed in said generating cavity, said vapor generating means including an upper liquid-vapor separating drum and a lower liquid drum extending across the width of said unit and a bank of generating tubes connecting said drums, a row of membraned roof tubes connecting said front wall tubes in communication with said upper drum and a row of membraned floor tubes connecting said front wall tubes to said lower drum, a row of spaced screen tubes connecting said drums, said screen tubes separating said furnace cavity from said vapor heating cavity, a predominantly radiant heated vapor heater disposed in said vapor heating cavity and arranged to receive separated vapor from said liquid-vapor separating drum, said vapor heating means including vertically disposed, spaced platens of inverted, drainable loop tubes, said platens extending upwardly through spaces formed between adjacent tubes of the roof and screen whereby said latter tubes provide lateral support for said platens within said pressure zone, burner means in said front wall arranged for discharging heating gases into said furnace wherein the heating gas flow is from the furnace cavity to the vapor heating cavity and thence through the vapor generating cavity to said flue opening in a single horizontal gas flow pass en masse in cross-flow heat transfer relationship to the entire exposed length of the vapor generating tubes and vapor heating tubes, and a baffle means disposed downstream gas-wise of said vapor heater, said baffle means forming an imperforate partition separating a portion of said vapor generating cavity from said vapor heating cavity to restrict the flow of said gas from the vapor heating cavity to said vapor generating cavity.

4. A pressure fired vapor generating and heating unit comprising rectangularly disposed integrally formed front, rear and side walls of generating tubes defining a pressure zone including a furnace cavity, a vapor generating cavity and a vapor heating cavity arranged in juxtaposed side by side relationship, said vapor heating cavity disposed between said furnace cavity and vapor generating cavity and in open communication with each of said latter cavities, means forming a flue opening in said rear wall, vapor generating means disposed in said vapor generating cavity, said vapor generating means including an upper liquid-vapor separating drum, a lower liquid drum and a bank of generating tubes connecting said drums, said side walls each including a plurality of side by side panel wall sections arranged in co-planar, contiguous relationship to one another, each panel section consisting of an upper side wall header segment, a lower side wall header segment and a row of upright generating tubes connecting said upper and lower header segments together, a rigid membrane connected between said upright tubes to form an imperforate, gas tight wall section, and means rigidly connecting the adjacent end portions of said panels to form a unitary side wall structure, supply tubes connecting each of said lower header segments of said side walls in fluid circulation with said lower liquid drum, riser tubes connecting each of said upper header segments of said side walls in communication with said liquid-vapor separating drum, a row of roof tubes connecting said front wall tubes in communication with said upper drum and a row of floor tubes connecting said front wall tubes to said lower drum, a predominantly radiant heated vapor heater disposed in said vapor heating cavity and arranged to receive separated vapor from said liquid vapor drum, and burner means arranged in said front wall opposite said vapor heater for discharging heating gases into said furnace wherein the heating gases flow en masse in horizontal cross-flow heat transfer relationship from the furnace cavity, through the vapor heating cavity and thence through the vapor generating cavity to said flue opening.

5. A prefabricated pressure fired vapor generating and heating unit comprising rectangularly disposed front and rear walls of vapor generating tubes and opposed side walls defining a pressure zone including a furnace cavity, a vapor generating cavity and a vapor heating cavity, said cavities being extended across the entire width of said unit and disposed in juxtaposed side by side relationship, said vapor heating cavity being positioned between said furnace cavity and vapor generating cavity in open communication with each of said latter cavities, means forming a flue opening in said rear wall, vapor generating means disposed in said vapor generating cavity, said vapor generating means including an upper liquid-vapor separating drum, a lower liquid drum and a bank of generating tubes connecting said drums, said side walls each including a plurality of prefabricated panel wall sections arranged in co-planar contiguous, side by side relationship to one another, each panel section consisting of an upper side wall header segment, a lower side wall header segment and a row of upright generating tubes connecting said upper and lower header segments together, a rigid membrane connected between said upright tubes so as to form an imperforate, gas tight section, means rigidly connecting the adjacent end portions of said panels to form a unitary side wall structure, supply tubes connecting each of said lower header segments in fluid circulation with said liquid drums, riser tubes connecting each of said upper header segments in communication with said liquid-vapor separating drum, a row of roof tubes connecting said front wall tubes in communication with said upper drum and a row of floor tubes connecting said front wall tubes to said lower drum, a row of spaced screen tubes connecting said upper and lower drums, said screen tubes separating said furnace cavity from said vapor heating cavity, a predominantly radiant heated vapor heater disposed in said vapor heating cavity and arranged to receive separated vapor from said liquid vapor drum, said vapor heater including an inlet header and outlet header disposed below the floor tubes, a plurality of vertically disposed platens of inverted nested loop tubes connecting said inlet and outlet headers, said platens extending upwardly through spaces formed between adjacent pairs of said floor, screen and roof tubes whereby said latter tubes provide lateral restraint for the looped ends of said platens within said pressure zone, burner means arranged for discharging heating gases into said furnace wherein the gases flow in a horizontal path through the furnace cavity to the vapor heating cavity and thence through the vapor generating cavity to said flue opening, a baffle means disposed downstream gas flow-wise of said vapor heater for restricting the flow of gases in flowing from said vapor heating cavity to said vapor generating cavity, and an outer casing means spaced from said roof tubes and front wall tubes and forming therewith an air duct by which combustion air is supplied to said burner means.

6. A prefabricated pressure fired vapor generating and heating unit comprising rectangularly disposed front and rear walls of vapor generating tubes and opposed side walls defining a pressure zone including a furnace cavity, a vapor generating cavity and a vapor heating cavity, said cavities being extended across the entire width of said unit and disposed in juxtaposed side by side relationship, said vapor heating cavity being positioned between said furnace cavity and vapor generating cavity in open communication with each of said latter cavities, means forming a flue opening in said rear wall, vapor generating means disposed in said vapor generating cavity, said vapor generating means including an upper liquid-vapor separating drum, a lower liquid drum, and a bank of generating tubes connecting said drums, said side walls each including a panel wall having an upper side wall header, a lower side wall header and a row of upright generating tubes connecting said upper and lower header segments together, a rigid membrane connected between said upright tubes so as to form an imperforate gas tight panel wall, supply tubes connecting said lower header in fluid circulation with said liquid drums, riser tubes connecting said upper header in communication with said liquid-vapor separating drum, a row of roof tubes connecting said front wall tubes in communication with said upper drum, and a row of floor tubes connecting said front wall tubes to said lower drum, a row of spaced screen tubes connecting said upper and lower drums, said screen tubes separating said furnace cavity from said vapor heating cavity, a predominantly radiant heated vapor heater disposed in said vapor heating cavity and arranged to receive separated vapor from said liquid vapor drum, said vapor heater including an inlet header and outlet header disposed below the floor tubes, a plurality of vertically disposed platens of inverted nested loop tubes connecting said inlet and outlet headers, said platens extending upwardly through spaces formed between adjacent pairs of said floor, screen and roof tubes whereby said latter tubes provide lateral restraint for the looped ends of said platens within said pressure zone, burner means arranged for discharging heating gases into said furnace wherein the gases flow in a horizontal path through the furnace cavity to the vapor heating cavity and thence through the vapor generating cavity to said flue opening, a baffle means disposed downstream gas flow-wise of said vapor heater for restricting the flow of gases in flowing from said vapor heating cavity to said vapor generating cavity, and an outer casing means spaced from said roof tubes and front wall tubes and forming therewith an air duct by which combustion air is supplied to said burner means.

References Cited in the file of this patent

UNITED STATES PATENTS

| | | |
|---|---|---|
| 1,746,272 | Murray | Feb. 11, 1930 |
| 1,774,136 | Forssblad | Aug. 26, 1930 |
| 2,112,202 | Lucke | Mar. 22, 1938 |
| 2,633,831 | Langrand | Apr. 7, 1953 |
| 2,715,068 | Andrews | Feb. 4, 1957 |
| 2,797,900 | Banker | July 2, 1957 |
| 2,835,231 | Evans et al. | May 20, 1958 |

FOREIGN PATENTS

| | | |
|---|---|---|
| 1,110,990 | France | Oct. 19, 1955 |
| 474,087 | Great Britain | Oct. 26, 1937 |